No. 827,044. PATENTED JULY 24, 1906.
G. H. SMITH.
TYPE WRITING MACHINE.
APPLICATION FILED APR. 21, 1900.

6 SHEETS—SHEET 1.

Attest:
Inventor,
George H. Smith
By Walter Donaldson
ATT'YS

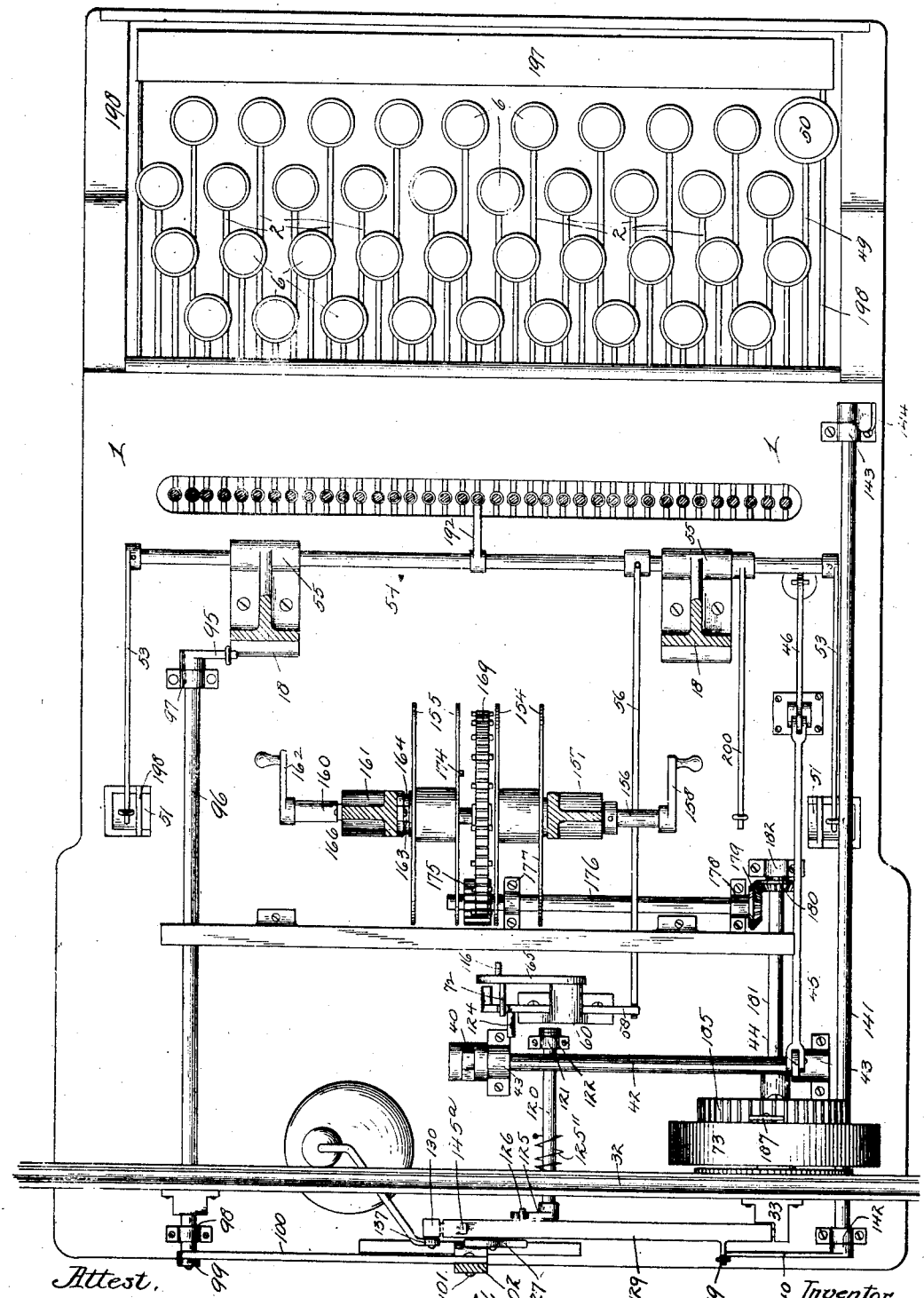

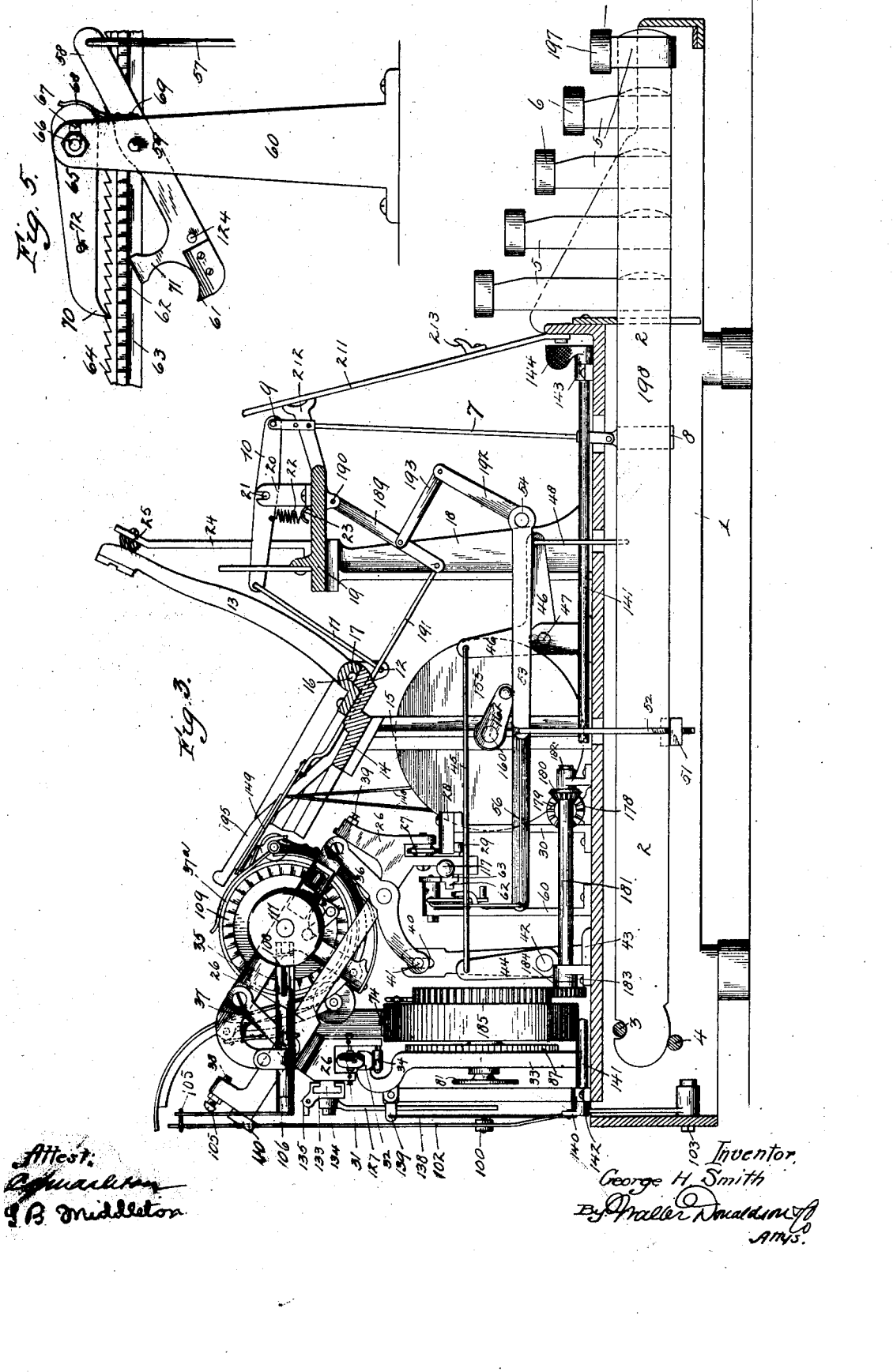

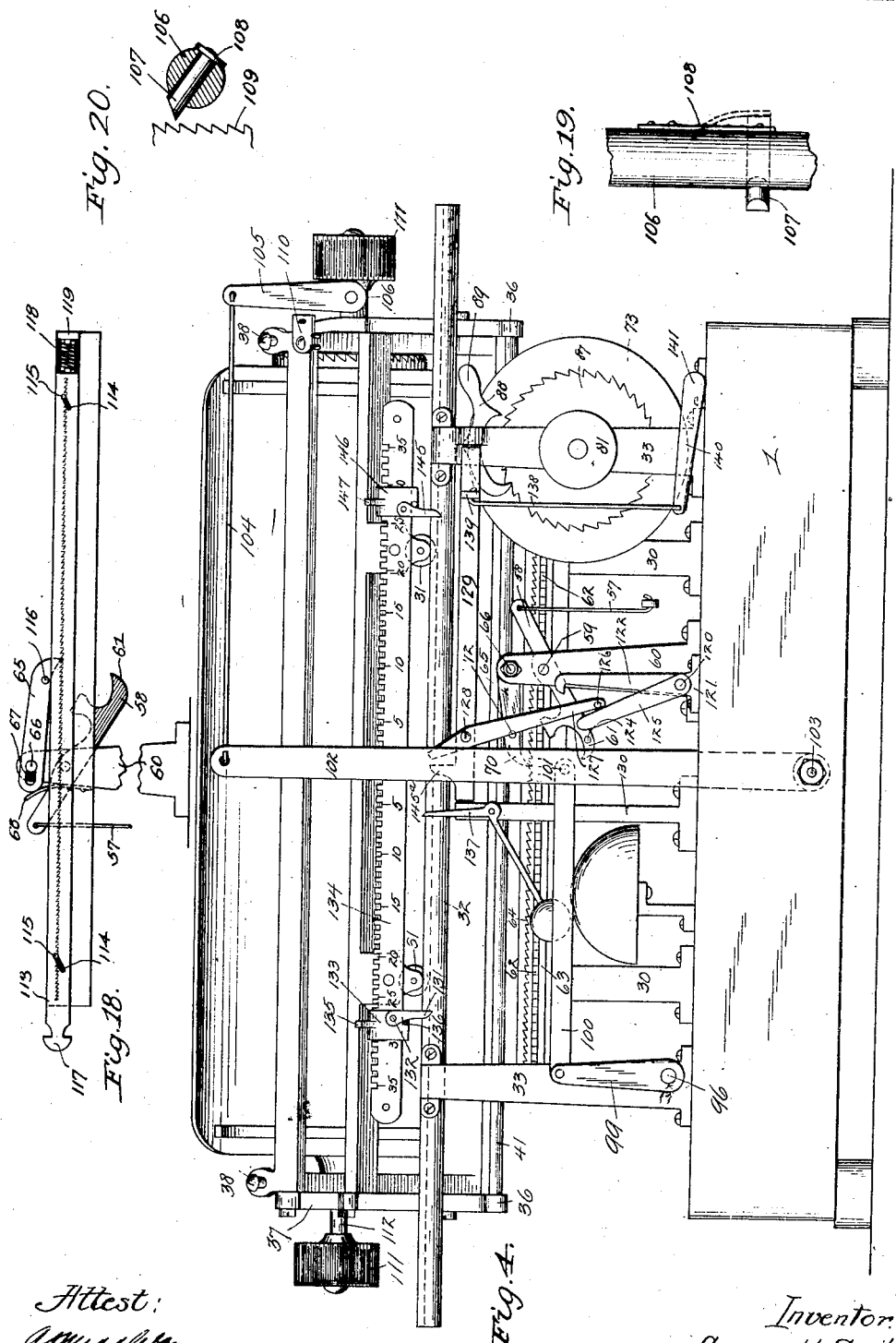

No. 827,044. PATENTED JULY 24, 1906.
G. H. SMITH.
TYPE WRITING MACHINE.
APPLICATION FILED APR. 21, 1900.
6 SHEETS—SHEET 5.
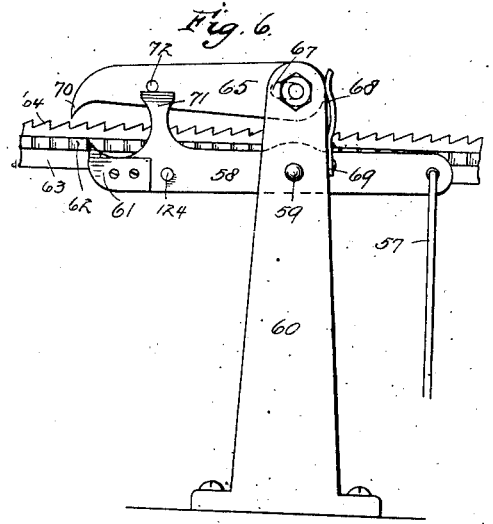
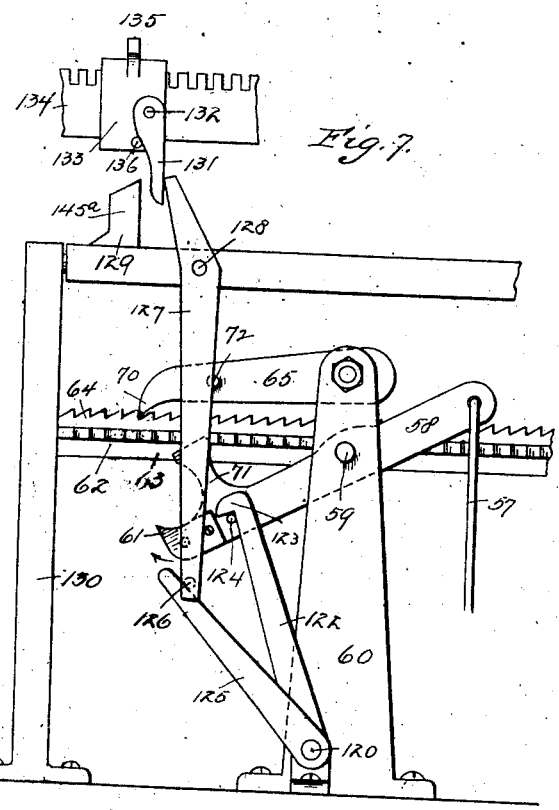
Attest,
C. O. Middleton
L. B. Middleton
Inventor,
George H. Smith
By Miller Donaldson
attys No. 827,044. PATENTED JULY 24, 1906.
G. H. SMITH.
TYPE WRITING MACHINE.
APPLICATION FILED APR. 21, 1900.

6 SHEETS—SHEET 6.

Attest:
Inventor
George H. Smith

UNITED STATES PATENT OFFICE.

GEORGE H. SMITH, OF CEDAR RAPIDS, IOWA, ASSIGNOR TO UNION TYPEWRITER COMPANY, OF JERSEY CITY, NEW JERSEY, A CORPORATION OF NEW JERSEY.

TYPE-WRITING MACHINE.

No. 827,044.     Specification of Letters Patent.     Patented July 24, 1906.

Original application filed June 16, 1897, Serial No. 640,951. Divided and this application filed April 21, 1900. Serial No. 13,773.

*To all whom it may concern:*

Be it known that I, GEORGE H. SMITH, a citizen of the United States, residing at Cedar Rapids, in the county of Linn and State of Iowa, have invented certain new and useful Improvements in Type-Writing Machines, of which the following is a specification.

I have shown the various features of my present invention applied to a so-called "visible-writing" machine in which the carriage is mounted to move transversely to the axis of the platen in a plane inclined to the horizontal plane of the machine, the type-bars each bearing more than one character are pivoted in front of the platen and incline away from it toward the front of the machine, so that the printing-point on the platen is in a radial line between vertical and horizontal planes passing through the axis of the platen, and in which horizontal key-levers pivoted at the rear of the machine extend forward under the platen and type-bars and are respectively operatively connected with their corresponding type-bars. Such general style of machine and the mechanical form in which the several features above named are embodied are claimed in my original application, Serial No. 640,951, filed June 16, 1897, of which this application is a division, and are not claimed herein.

This invention consists in the construction, arrangement, and combination of elements hereinafter set forth, and particularly pointed out in the appended claims.

Figure 1:
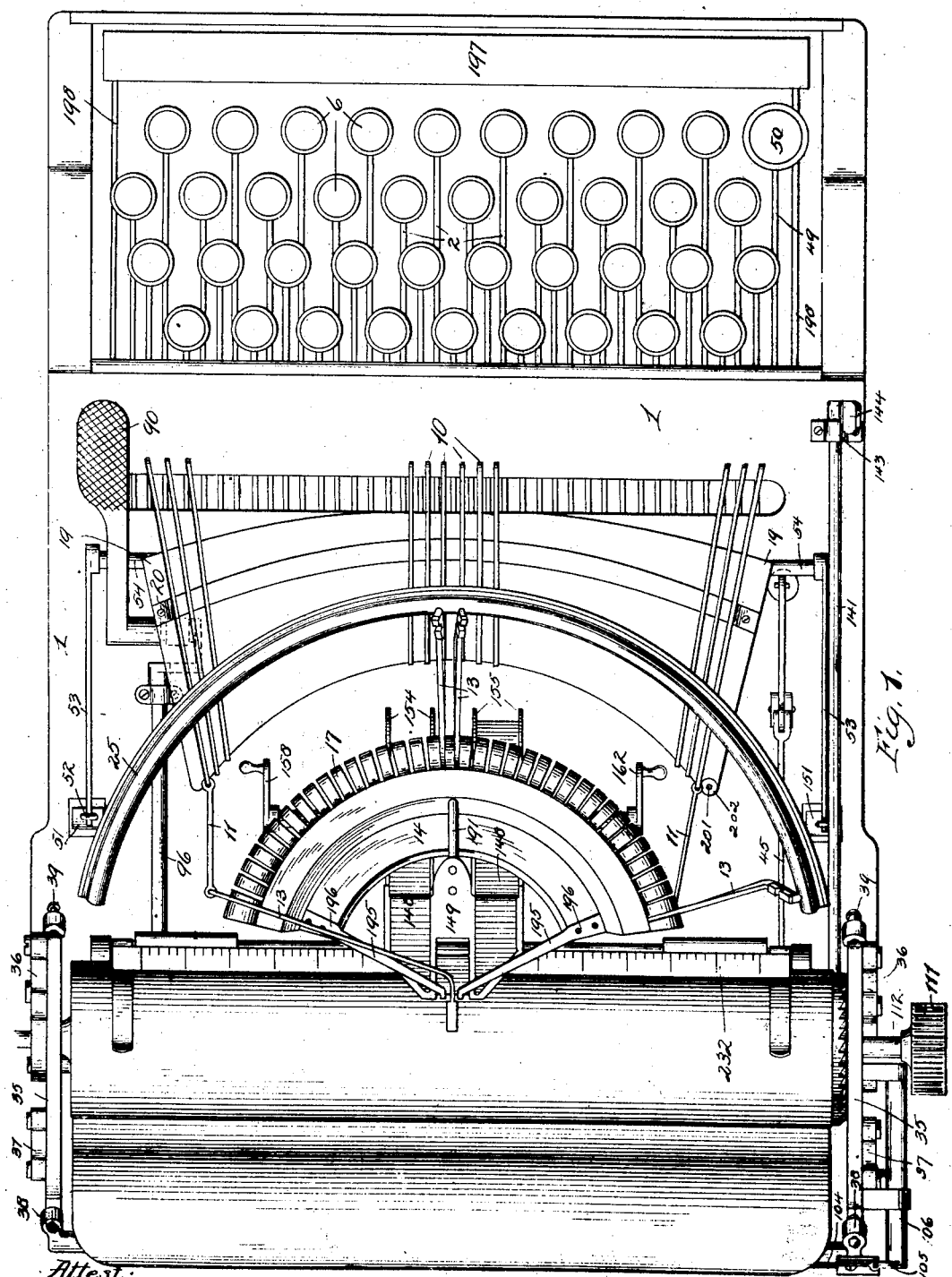
Figure 10:
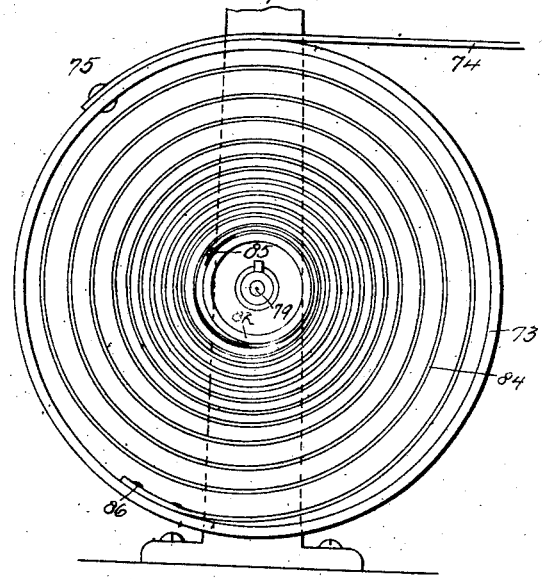
Figure 11:
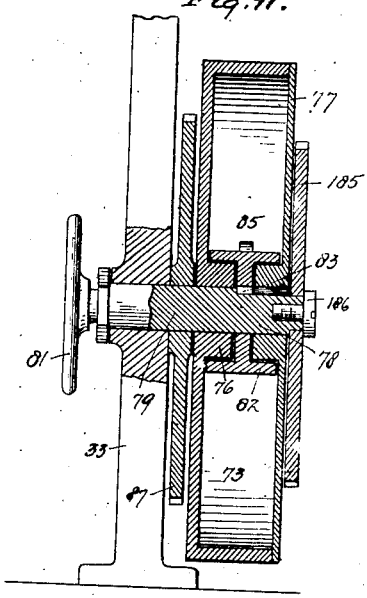
Figure 12:
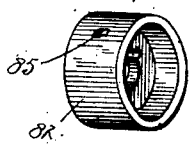
Figure 13:
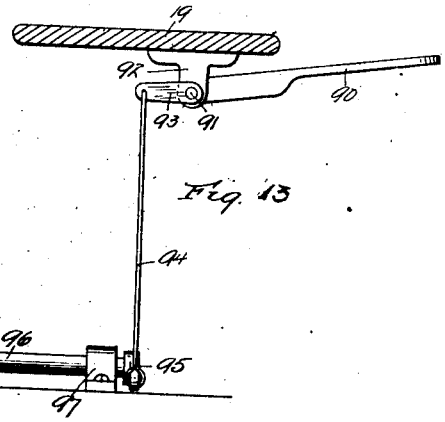
Figure 14:
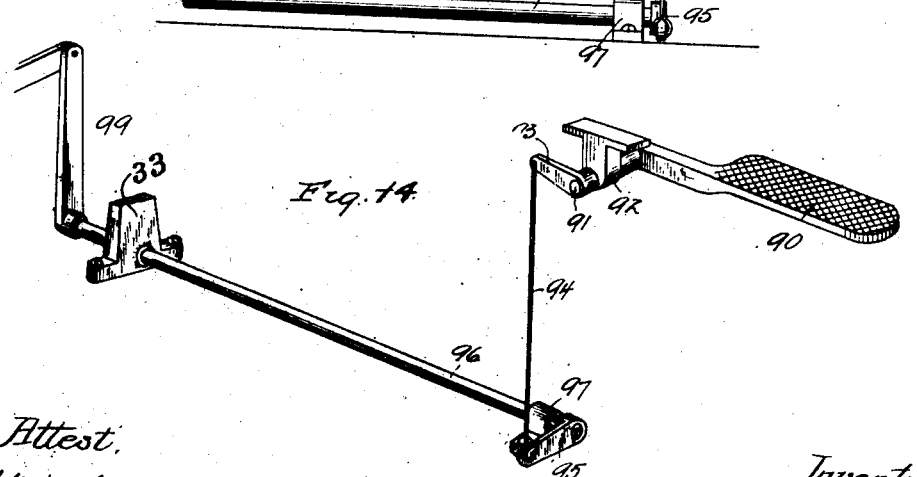

In the accompanying drawings, forming a part of this specification, and wherein like reference characters designate corresponding parts in the various views, Figure 1 is a plan view of the machine. Fig. 2 is a similar view with the upper portion thereof removed, so as to more clearly illustrate the escapement and ribbon-feeding mechanism, the view corresponding to a horizontal section taken below the segment and with the carriage removed. Fig. 3 is a longitudinal or front-to-rear section, the operating parts being shown in elevation and that portion of the crown-plate which is in elevation is shown unslotted, the type-bars being, therefore, omitted therefrom. Fig. 4 is a rear elevation of the machine. Fig. 5 is an enlarged detail view of the feed or escapement mechanism, the view illustrating the stepping dog in engagement with the teeth of the rack-bar. Fig. 6 is a similar view of the same, which shows the holding-dog in engagement with the teeth of its rack-bar, the stepping dog being disengaged by this position of the stepping dog. Fig. 7 is an enlarged detail elevation of the feed or escapement mechanism and the line-locking mechanism. Fig. 8 is a plan view of a portion of the double feed-rack bar. Fig. 9 is a cross-section thereof. Fig. 10 is an enlarged detail sectional view of the spring-drum for propelling the carriage. Fig. 11 is a transverse sectional view of the same, the spring being omitted and the view being taken at right angles to the position of the parts shown in Fig. 10. Fig. 12 is a detail perspective view of the flanged bushing for attaching the actuating-spring to the key-shaft of the drum. Fig. 13 is a detail side elevation of a portion of the mechanism for returning the carriage to the right. Fig. 14 is a perspective of the same. Fig. 15 is an enlarged detail side view of the spring and arm actuated thereby for holding the spacing rock-shaft in its normal position. Fig. 16 is a fragmentary detail plan view of the interposed bar for the securement of the lower ends of the type-bar-returning springs. Fig. 17 is a cross-section thereof. Fig. 18 is a detail front view of a portion of the escapement mechanism, showing the carriage-release. Fig. 19 is a fragmentary detail elevation of the line-spacing pawl for actuating the paper-roll or platen prior to the return of the carriage to the right to begin a new line; and Fig. 20 is a cross-section of the same, showing a portion of the teeth which are formed upon the paper-roll.

The hollow base 1 of the machine supports a suitable framework in which various of the operating parts of the machine are mounted, and in the rear portion of this base are fulcrumed the key-levers 2 in any convenient manner, this being here shown as accomplished by the engagement of the recessed ends of the bars with the rod 3, while a rod 4 serves to prevent the disengagement of these recessed ends from the rod 3. The front ends of the key-levers have secured thereto the key shanks or stems 5, which in turn support the key-heads 6, the latter being constructed as hereinafter set forth.

A connecting wire or link 7 is provided for each of the key-levers and is connected thereto by being pivoted to a band 8, which surrounds said bar, the upper end of the link being pivoted at 9 to a lever 10, whereas the inner end of the latter has a link 11 connected thereto, while the lower end of said link is attached at 12 to the heel of its type-bar 13, it being understood that these parts are provided for each of the type-bars.

A crown plate or segment 14 is supported upon the standards 15 and may be set at an angle to accord with the general style of machine illustrated but not claimed herein. To this segment are pivoted at 16 the type-bars by means of a segmental slotted cap or plate 17, which is secured to the segment by means of suitable screws, and this arrangement permits the ready mounting or removal of the entire series of type-bars when the cap is removed.

Standards 18, projecting upward from the bed, serve to support a plate 19, upon which is secured a segmental slotted bar 20, having a groove or notch formed in the upper face or edge thereof, which serves as a bearing for the pivots 21 of the levers 10, and a spring 22 is attached at one end to each of the levers 10, whereas the lower end of each of said springs is attached to the strip 23, so that each spring serves to return a lever 10 and its associated parts to their normal positions, thereby returning the type-bars after being moved forward to the printing-point. The plate 19 also supports the segmental buffer-plate 24, having secured to its upper portion a buffer-strip 25, against which the upper ends of the type-bars come in contact in being returned to their normal positions.

The carriage 26, which may be of any suitable construction, has journaled therein at the front portion an antifriction bearing-roller 27, which is adapted to run upon the track 28, and the carriage is held upon the track 28 by antifriction-rollers 29, which bear upon the under side of said track, whereas the track is supported by the uprights 30. The rear portion of the carriage has journaled therein antifriction-rollers 31, which are adjustable by means of suitable set-screws, and these rollers travel in a grooved track 32, which is properly supported by the standards 33, the upper ends of which are curved so as to permit the roller 34, which is carried by the carriage, to travel against the under side of this track. By this arrangement it will be seen that the carriage will be held against displacement in any direction except longitudinally, and in this direction it will be free to travel from end to end of the machine upon the tracks 28 and 32.

A platen-frame 35, composed of side and cross-bars, is mounted upon the carriage by means of the levers or parallel links 36 and 37, which are pivoted to said carriage and the platen-frame in such manner as to hold the latter parallel with the former, while at the same time permitting a limited transverse swinging movement of the platen-frame relatively to the carriage, the object of which is to shift the position of the paper-roll or platen 37ª relatively to the type, so as to accomplish the printing of upper or lower case characters, and this swinging movement is limited by the set-screws 38 and 39, carried by the carriage, and by means of which the extent of movement of the platen-frame may be varied. This movement of the platen with relation to the carriage is brought about by slotted crank-arms 40, which engage a rod 41, that is secured to extend between depending arms which extend from the links 36. The slotted crank-arms 40 are secured to a rock-shaft 42, which is journaled in suitable bearings 43 on the base, and movement is imparted to this rock-shaft through a crank-arm 44, secured to the rock-shaft, and which is connected by a link 45 to the bell-crank lever 46. The bell-crank lever 46 is pivoted at 47 to a stud which projects from the base, and the horizontal arm of the bell-crank is connected by the link 48 to the shift key-lever 49, which has a finger-key 50 at the forward end thereof, which may have the word "Case" thereon. It will therefore be seen that when it is necessary to print upper-case characters the depression of this "case-key" will operate the parts so as to bring about the proper movement of the mechanism just described for carrying the platen to a higher plane, which on account of the inclined position of the carriage will also be rearward, and this upper-and-rearward movement of the platen will, as before stated, bring the printing-line on the platen into the path of the upper-case types on the type-bars as to effect the change of case or printing position.

The machine thus far described is the general style of machine to which the improvements herein claimed and now to be described have been shown applied.

As is well understood in connection with type-writing machines, it is necessary that a traveling carriage carrying a platen should be moved step by step at the operation of each type-bar through the medium of the key-levers or other moving parts and also that said carriage should likewise move one space for every actuation of a spacing key or bar, and this I accomplish in the following manner: A universal bar 51 extends transversely beneath the entire set of key-levers, so that when any key-lever is depressed this bar will likewise be depressed, and the latter is connected, by means of the links 52, to crank-arms 53, each of which is secured to one end of the rock-shaft 54, that is journaled in the bearings 55, which are formed with or secured to the standards 18. This rock-shaft likewise has a lever 56 secured thereto, and which extends rearwardly and is connected, by means of the link 57, to the heel of a feed dog or pawl 58, which acts as a holding-dog and is pivoted at 59 to the post 60, which is secured to the base of the machine. The holding-dog terminates in a nose 61, adapted to engage with the horizontally-projecting teeth 62 of the double rack-bar 63, while a similar series of teeth 64 project vertically from said bar for purposes which will be hereinafter described. A second feed-dog pawl 65 is connected to the upper end of the post 60 by a suitable bolt or pin 66, which passes through a slot 67, formed in said pawl, so that the dog may have a sliding movement in the direction of the travel of the carriage, as well as a pivotal movement around the pin 66. This feed-dog therefore constitutes a stepping dog, and it is advanced toward the right of the machine, considered from the front thereof, by a spring 68, bearing against the heel of the dog, said spring being secured at 69 to the post, as clearly shown in Figs. 5 and 6. The nose 70 of this pawl is adapted to engage with the teeth 64 of the double rack-bar, and when so engaged will hold this bar and the carriage to which it is connected against longitudinal movement toward the left; but when the holding dog or pawl is swung upward its nose 61 will pass into engagement with one of the teeth 62 on the rack, and thereafter a further movement of this holding-dog will cause the abutment 71, which is carried thereby, to contact with the pin 72, projecting from the stepping dog 65, thus disengaging it from the teeth 64.

The movement of the escapement mechanism relative to the type-bars is as follows: As the type-bar is making its movement toward the printing-point the holding-dog 58 is making a corresponding movement toward the teeth 62 of the rack, the movement between the nose of this pawl and the rack being about one-sixth, more or less, of that of the type-bar at about one-half to three-fourths of an inch from the end of the advance movement of the type-bar, and the nose of the actuating-pawl is thrust into engagement with the rack before the stepping pawl has been disengaged therefrom, and the abutment 71 on said holding-dog then lifts the stepping dog out of engagement with its rack and it is advanced one step to the right by its spring. Now on the return movement of the type-bar and when it reaches the distance of about one-half to three-fourths of an inch from the printing-point the nose of the holding-dog drops out of engagement with its rack, and during this disengaging movement the stepping dog is permitted to engage the advance tooth of its rack, and when a disengagement of the holding-dog is effected the forward movement of the carriage takes place. By this means I secure a very rapid and efficient escapement mechanism, the movement of the carriage taking place immediately after the imprint of the type, and in rapid writing there is therefore no tendency to crowd or pile the work or to produce "ghosts" in writing, inasmuch as the carriage has ample time to complete a letter-space movement before a type-bar can again be moved to the printing position. This is a very desirable feature and is obtained in an exceedingly simple manner in the above-described construction. The rack-bar 63 is secured to the lower portion of the carriage, as clearly shown in Fig. 3, so that at every movement of said rack-bar the carriage moves a like distance to bring about the intermittent letter-space of the paper.

The carriage is moved in the direction of its feed when the escapement mechanism just described is actuated by means of a spring-drum 73, to the periphery of which a flexible strap 74 is secured at 75, the opposite end of this strap being secured to the carriage, so that the spring tends to move the carriage from right to left.

The drum 73 consists of the main body thereof, having a short hub 76, projecting inwardly, and a cap 77, removably secured in place, which also has a short hub 78, likewise projecting inwardly therefrom, and these two hubs are fitted to run upon the shaft 79, the latter being journaled in the standard 33 and carrying a hand-wheel 81 for turning it. A flanged bushing 82 is keyed to the shaft 79, as indicated at 83, and is interposed between the hubs of the drum and its cap in such manner that the flanges thereof surround these hubs, thereby giving a true cylindrical bearing on the periphery for the spring 84, which latter has its inner end attached to said bushing by means of a hooked lug 85, while the outer end of this spring is secured at 86 to the inner wall of the drum. By this arrangement the spring tends to rotate the drum, so as to reel the strap 74 upon the periphery thereof for the purpose above set forth, and the reaction of the spring will tend to rotate the shaft 79 through the bushing 82 in the opposite direction. This movement of the shaft is prevented by a ratchet-wheel 87, secured to the shaft outside of the drum, and which is engaged by a pawl 88, as clearly shown in Fig. 4. This pawl 88 is pivoted to the standard 33 and terminates in a handle 89, whereby it may be so manipulated as to permit the step-by-step unwinding of the spring 84 when occasion requires, and the spring is wound by the operation of the hand-wheel 81, during which operation the pawl will ride freely over the teeth of the ratchet and hold said ratchet against a retrograde movement whenever the hand-wheel is released.

When a line of printing has been formed, it is necessary to return the carriage to the right to begin a new line and at the same time to revolve the platen a line-space distance to present a new surface of paper for the next line of writing, and while this is usually accomplished in type-writing machines as now constructed by grasping some portion of the carriage or lever carried thereby and moving said carriage directly by the hand through the distance required I accomplish these movements by a lever at the front of the machine and above the keyboard, the only manipulation of which is the depression thereof, which is effective to first turn the platen upon its axis the desired distance for line-spacing and then to move the carriage back to the right to begin a new line, and the construction of the mechanism for accomplishing this result is as follows: A hand-lever 90 is secured to a short rock-shaft 91, which latter is journaled in the bearing 92, secured to the under side of the plate 19, and the inner end of this shaft has secured thereon the short crank-arm 93, which is connected by the link-rod 94 to a crank-arm 95, secured to the forward end of the rock-shaft 96, which is journaled in suitable bearings 97 and 98, (see Fig. 2,) secured to the base of the machine. Secured to the rear end of the shaft 96 is a vertical arm 99, considerably longer than the arm 95 and having pivoted to its upper end the bar or link 100, the opposite end of which is pivoted at 101 to the lever 102, that has its lower end pivoted at 103 to the base, whereas its upper end extends above the carriage and is connected by the link-rod 104 to the arm 105. This arm 105 is secured to the rear end of a shaft 106, which latter is journaled in suitable bearings in the platen-frame 35 and carries a sliding line-spacing pawl 107, (see Figs. 19 and 20,) which is held in its normal position by the spring 108, secured at one end to said shaft and at the other end to the pawl. The nose of this pawl is adapted to engage with the teeth 109, projecting from a line-spacing ratchet-wheel secured to one end of the platen 37ª, so that when the arm 105 is given a swinging movement it causes the shaft 106 to turn on its axis, and the pawl carried by said shaft will rotate the platen for line-spacing the distance between two or more teeth 109 of the ratchet-wheel. The distance the platen is rotated will depend upon the adjustment of a stop 110, which is adjustably secured to the carriage. (See Fig. 4.) This stop determines the independent movement of the arm 105 with relation to the carriage. Thus a depression of the hand-lever 90 transmits motion through the intervening levers, which motion is multiplied and is effective to first swing the arm 105, so as to rotate the platen through the line-spacing pawl and ratchet until said arm comes in contact with the stop 110, after which the further movement of the hand-lever will move the carriage, with the arm 105, to the right, thereby restoring the carriage. When the hand-lever 90 is released, the carriage will be held by the escapement mechanism before described, thus by a single operation effecting a line-spacing movement of the platen and restoring the carriage to a position to commence a new line of writing.

For convenience in revolving the platen independently of the mechanism just described a finger-wheel 111 is secured to each end of the platen-shaft 112, and for convenience in shifting the carriage independently of the escapement mechanism I arrange a push-bar or carriage-release 113 upon the rack-bar 63, as shown in Fig. 18. This push-bar has formed therein inclined slots 114, through which project the pins 115, that are carried by the rack, so that when said bar is forced from left to right in Fig. 18 it will ride upward on these pins to equal extents at both ends, and this elevation of the bar will force the stepping dog 65 out of engagement with the teeth 64 by coming in contact with the pin 116, carried by the dog, thus freeing the rack-bar from the escapement pawls or dogs irrespective of the position of the carriage and permitting the carriage to be moved in either direction. For convenience in manipulating the push or release bar a knob 117 is attached to one end thereof and a spring 118 interposed between its opposite end and a shoulder 119, formed upon the rack-bar.

Much inconvenience is often occasioned in type-writing machines of ordinary construction in "piling up" letters at the end of a line—that is to say, writing one letter or character upon top of another after the carriage has been stopped at the end of a line and the carriage will feed no farther. This occurs where the operator has neglected to note the alarm or the sounding of the bell provided for the warning of the operator that the limit of the feed movement of the carriage has been reached. I overcome this difficulty by providing an automatic locking mechanism which will arrest the movements of the escapement mechanism when the carriage reaches the end of a line, thus preventing the depression of the keys, thereby rendering it impossible for the operator to pile up the letters at the end of a line, and the mechanism for accomplishing this result is as follows:

A rock-shaft 120 is journaled in the bearings 121, secured to the base, and the shaft has secured upon its forward end a locking-lever 122, the upper end of which terminates in a catch 123, and this catch is adapted to engage a member of the escapement mechanism, such as the pin 124, projecting from the feed-dog 58, so that it is only necessary to swing the locking-arm 122 in such manner as to cause the catch to engage this pin to prevent the dog from being operated by its mechanism, which, as before described, is actuated by character and spacing keys. The locking-arm is given the proper swinging movement when occasion requires through the medium of an arm 125, which is secured to the outer end of the rock-shaft 120, and this arm projects upward within the field of movement of the pin 126, which extends from the lower end of the trip-lever 127, which is pivoted at 128 to the rock-bar 129. This bar is journaled between the post 130 and the upright 33, as clearly shown in Fig. 4, and the abutment or trip-lever 127 extends upwardly from its pivot-point within the field of travel of the trip or abutment 131, which is pivoted at 132 to the adjustable block 133, that is fitted upon the scale-bar 134, said bar having notches formed in its upper edge for the engagement of a latch-pin 135, and by means of which the block and trip may be adjusted to any desired point on the bar, and the scale enables the proper adjustment to be quickly effected. The movement of the trip around its pivot is limited in one direction by the pin 136 projecting from the adjustable block; but the trip is free to be vibrated in an opposite direction.

The bar 134 being rigidly secured to the carriage, it will be seen that as the carriage nears the limit of its movement in the direction of the feed thereof, as determined by the positioning of the trip, said trip will come in contact with the bell-lever 137 and after sounding the bell will next come in contact with the upper end of the trip-lever 127, causing the lower end thereof to swing in the direction of the arrow in Fig. 7. This swinging of the trip-lever will actuate the arm 125, as before described, through the medium of the pin 126, and it in turn will swing the locking-lever 122, so that the catch thereon will engage with the pin 124, thus securely locking the escapement-dog 58 against operation, and, as before stated, this dog being operatively connected with each of the key-levers by suitable intervening mechanism none of said key-levers can thereafter be depressed; yet it is often necessary after the line-locking mechanism has been operated to lock the parts to add one or more letters or characters for the completion of a word or for the insertion of a hyphen, and therefore means have been provided by which the operator can release the locking mechanism at any time, so that, if necessary, the escapement mechanism may be unlocked by the depression of a suitable key, and for this purpose a rod or link 138 connects the arm 139, projecting from the rock-bar 129, with the arm 140, which is secured upon the key-actuated rock-shaft 141, journaled in the bearings 142 and 143, that are secured to the base, and the front end of this shaft has secured thereto a hand-operated key 144, which is in the nature of a crank-arm and is within easy access of the operator at the front of the machine and near the keyboard. Thus it will be seen that after the escapement mechanism has been locked, as before described, it may be again released by the depression of the key-lever 144, since when this lever is depressed the arm 140 through the connecting-rod 138 will swing the rock-bar 129, upon which is pivoted the trip-lever, in such manner as to carry the upper end of said lever out of the line of travel of the trip-dog 131, thereby releasing said lever and permitting it to be returned from the position shown in Fig. 7 to its normal position, (shown in Fig. 4,) the pin 126 being of sufficient length to permit this movement without passing out of engagement with the arm 125. A spring 125", Fig. 2, returns the lever 127 to normal position, acting through the shaft 120, with which it is connected and the arm 125.

By the return of the trip-lever to its normal position, as just described, the locking-lever 122 will be returned to its normal position, thereby disengaging the catch 123 from the pin 124, which will release the escapement mechanism and permit the further operation of the key-levers, and when the carriage is again moved to the right the trip 131 will be vibrated around its pivot without transmitting movement to the levers 127.

The stopping of the carriage at the point where the lines of printing are started is accomplished by the dog-trip or margin-stop 145, pivoted to the block 146, which is fitted to slide upon the scale-bar 134 and is made adjustable thereon by a suitable latch-pin 147, adapted to engage with the notches of the bar, whereby this point of starting may be varied to suit the requirements of the work.

A stop 145ª projects upward from the rock-bar 129 and is normally in the field of travel of the dog 145, so that when the carriage has reached in its return movement the marginal limit this dog comes in contact with this stop and prevents a further movement of the carriage in this direction; but should it at any time become desirable to print within the marginal space without disturbing the adjustment of the machine this is readily accomplished by turning the rock-bar upon its axis by the key-actuated mechanism before described, which will swing the stop 145ª out of the field of travel of the dog or trip 145 and permit the latter to pass to the right of it. As, for example, if instead of starting at the limit of the line it is desirable to start, say, ten spaces from the beginning of the line, the block 146 is slid along the bar 134 to the corresponding point indicated on scale thereof, and at each return of the carriage it will be arrested ten spaces short of the full extent of movement. Now when it is desired to write within the margin thus made all that is necessary is to move the key 144, thus turning the bar 129 by the mechanism connected therewith and throwing the stop out of line of the dog 145. The carriage can then be drawn to the limit of its movement. Then as the writing proceeds the dog 145 will move freely over the stop 145ᵃ on said rock-bar, and the carriage proceeds to the end of its movement, it being understood that the dog is free to move around its pivot in one direction, but is prevented from such movement in an opposite direction. In returning the carriage again if it is not desired to write within the marginal space the carriage will stop ten spaces short of the limit of its movement and so continue to do until it is desired to write within the margin again, when the key 144 will be employed, as just described.

The ink is furnished for the impression of the type upon the paper by a ribbon 148, which passes over the ribbon-guide 149 to and from the ribbon-spools 154 and 155, situated centrally of the machine, the former of which is secured upon the shaft 156, that is journaled in the bearing 157 and is provided with the crank-handle 158 for its manipulation. The spool-reel 155 is splined to a separate crank-shaft 160, said shaft being journaled in the bearings 161 and carrying a crank-handle 162 for its manipulation. The rotation of the ribbon-spools is controlled by a gear 169, pinion 175, shaft 176, bevel-gears 179 and 180, shaft 181, pinion 183, and gear 184, operatively connected to the spring-drum.

The automatic movement of the ribbon-guide is brought about by a lever 189, which is pivoted at 190 to the under side of the plate 19 and is pivotally connected to said guide by the rod 191, and the lever 189 in turn is actuated by the arm 192, connected thereto by the link 193, said arm being secured upon the rock-shaft 54, which, as before stated, receives an oscillating movement from the key-levers through the arms 53, links 52, and universal bar 51. Thus upon the depression of any of the character-keys for the actuation of a corresponding type-bar the ribbon-guide will be forced upwardly and rearwardly in an inclined direction into its active position, and upon the release of the key it will be returned to its inactive or normal position, the perpendicular sections of the ribbon being slackened by this last movement.

The ribbon-guide is permitted to slide to and fro, as just described, by being fitted within the bearings formed in the alinement-bars 195, said bars being secured to the crown-plate 14, as indicated at 196, and constitute a type or type-bar guide.

The upper ends of the alinement-bars terminate in proximity to each other, a space being left between them of sufficient width to just permit the passage of the outer ends of the type-bars in the movement of a type to the printing-point, and this, as is obvious, will guide the type in such manner as to cause each type to strike in exactly the same relative position, thereby producing exact alinement.

The foregoing description of the ribbon mechanism is deemed sufficient, inasmuch as such mechanism is not claimed herein but constitutes the subject-matter of a divisional application filed by me on the 29th day of December, 1903, and bearing Serial No. 186,976.

The spacing between the words and for other purposes is accomplished by the depression of the spacing key or bar 197, which is supported by the two key-levers 198, running rearwardly within the base and parallel with the character-key levers and resting upon the universal bar 51, thus actuating the escapement mechanism in the same manner as said mechanism would be actuated by any of the character-key levers, and this mechanism and others actuated by the shaft 54 are returned to their normal positions by the coil-spring 199, the lower end of which is attached to the arm 200, Figs. 2 and 15, secured upon said shaft, while the upper end of said spring is attached to the adjustment-rod 201, which latter passes through the plate 19 and has screwed upon its upper threaded end a thumb-nut 202 for increasing or decreasing the tension of the spring, and thus regulating the speed of the return movement of the parts controlled thereby.

To partly conceal the operating mechanisms while in motion, a fender-plate 211 projects upwardly and rearwardly from the base to the rear of the keyboard and between the keyboard and the platen at a slight inclination and may be supported near the center thereof by a suitable bracket 212, projecting from the plate 19, whereas the lower end of this so-called "fender" may be supported on the base, and this fender-plate may be utilized as a copy-holder by the securement of the rack or support 213 to the lower portion thereof. This will be found of great convenience, from the fact that the copy appears immediately in front of the operator, while at the same time the matter written or being written upon the paper on the platen is not obstructed by the fender and is within clear view of the operator, and but a slight change of the line of view is necessary to examine either the copy on the copy-holder or the matter written on the paper on the platen.

A scale 232 is secured to the front of the carriage, and this, as well as the scale 134, is graduated from the center toward each end, thus enabling the operator to center his work more rapidly than with the other forms of scales, and since this is the particular object of having a scale this feature is very desirable. For example, suppose the operator had a line of thirty letters which he desired to place exactly in the middle of the page all he would have to do would be to mentally divide thirty by two, giving fifteen as a result, and then set the carriage to commence at fifteen on the scale to the left of the center, while with the other forms of scales he would have to find his center on the scale and then count back fifteen before he could set his carriage at the proper point.

I am aware that various modifications may be made in the construction of the mechanism shown and described and hereinafter claimed without departing from the spirit of my invention, and I therefore do not wish to be limited to those exact details of construction represented.

What I claim as new, and desire to secure by Letters Patent, is—

1. In a type-writing machine, the combination of a rack-bar rigidly secured to the carriage, two sets of teeth projecting from said bar, an escapement-dog adapted to engage with one set of said teeth, said dog having a limited spring-actuated longitudinal movement, a pin projecting from the escapement-dog, a second escapement-dog under the control of the key mechanism, the nose of the last-named dog being adapted to engage with the other set of teeth on said rack-bar, an abutment carried by the second-named dog for disengaging the first-named dog from its set of teeth by contacting with the pin projecting therefrom, a locking-lever, a trip-lever adapted to actuate the locking-lever, a trip carried by the carriage for swinging the trip-lever to cause the locking-lever to engage a pin projecting from one of said escapement-dogs and mechanism under the control of the operator for swinging the trip-lever out of engagement with the trip, substantially as and for the purpose set forth.

2. In a type-writing machine, the combination of a spring-drum having a hub, a spring coiled within said drum and one end of which is attached thereto, a key-shaft, a flanged bushing secured to the shaft and overlapping the hub of the drum, a lug projecting from said bushing, whereby the inner end of the spring is secured to said bushing, a ratchet-wheel rigidly secured to the key-shaft, a pawl for normally retaining the ratchet against a retrograde movement but which when desired permits such a movement by a step-by-step escapement and a finger-wheel for manipulating the shaft, substantially as and for the purpose set forth.

3. In combination with a type-writing machine, a spring-drum comprising a main body having a short hub projecting inwardly therefrom, a cap also having a short hub, a shaft run through said hubs and journaled in a standard of the frame, a flanged bushing secured on the shaft between the short hubs so that the flanges surround said hubs, a spring attached at one end to the drum and at the other end to the flange of the bushing, and connections between said drum and the carriage, as and for the purpose described.

4. In a type-writing machine, the combination of a rack-bar secured to the carriage, two sets of teeth projecting from said bar, an escapement or feed dog adapted to engage one set of teeth on said rack-bar said dog having a limited spring-actuated longitudinal movement, a second feed-dog for engaging the other set of teeth on said rack-bar and disengaging the first-named dog, connections between one of said dogs and the type-levers, a locking-lever for engaging the last-named feed-dog, a trip-lever for actuating the locking-lever, a rock-bar to which said trip-lever is pivoted, a trip on the carriage to engage the trip-lever, and means for moving said rock-bar, as and for the purpose described.

5. In a type-writing machine, the combination of a carriage, a platen mounted therein, line-spacing teeth carried at one end of the platen, a rock-shaft, a line-spacing pawl carried thereby to engage the teeth on said platen, an arm on the end of the rock-shaft, an adjustable stop secured on the carriage to limit the movement of said arm with relation to the carriage, a lever journaled to the frame of the machine and intermediate connections between said arm and lever, whereby when the latter is depressed the platen will be turned and said arm coming in contact with the adjustable stop will return the carriage to the right, substantially as shown and described.

6. In a type-writing machine, the combination of a carriage, a rack having two rows of teeth, a first feed-dog normally engaging one row of teeth, a second feed-dog normally retracted from the other row of teeth and which actuates said first dog, a locking device to hold the said second dog in retracted position, means for rocking the locking device out of engagement with the second dog, and a line-lock stop or abutment coöperating with said rocking means, substantially as described.

7. In a type-writing machine, and line-lock mechanism therefor, the combination of a carriage, escapement mechanism therefor, an abutment on the carriage, a rock-shaft, hand-operated means for turning the rock-shaft, a line-lock abutment on the rock-shaft which is movable independently of the same when operated by the line-lock abutment on the carriage, and the connection between said movable abutment and the escapement for automatically locking the escapement against movement, substantially as described.

8. In a type-writing machine, the combination of a carriage, a rock-bar, an escapement, a lever carried by the rock-bar movable independently thereof, a locking-lever adapted to engage a member of the escapement and a line-lock abutment on the carriage, substantially as described.

9. In a type-writing machine, the combination of a carriage, an escapement, a rock-bar held against movement longitudinally, a trip-lever pivoted to said rock-bar, a line-lock lever adapted to engage a member of the escapement and a line-lock abutment which is adapted to actuate the said trip-lever, substantially as described.

10. In a type-writing machine, the combination of a carriage, escapement mechanism therefor, pivoted abutments on the carriage, the rock-shaft held against endwise movement, the pivoted trip-lever on the rock-shaft, a line-lock lever adapted to engage a member of the escapement mechanism, a connection thereto from the trip-lever, a margin-stop on the rock-shaft, and hand-operated means for turning the rock-shaft, substantially as described.

11. In a type-writing machine and in a line-lock mechanism therefor, the combination of a carriage, carriage-escapement mechanism including a feed-dog, a line-lock abutment carried by the carriage, a coöperating line-lock abutment on the machine, and locking means controlled by said last-mentioned abutment for positively engaging the feed-dog to prevent an operation of the machine.

12. In a type-writing machine and in a line-lock mechanism therefor, the combination of a carriage, carriage-escapement mechanism including a feed-dog, a line-lock abutment carried by the carriage, a coöperating line-lock abutment on the machine, locking means controlled by said last-mentioned abutment for positively engaging the feed-dog to prevent an operation of the machine, and hand-operated means for moving one of said abutments out of contact with the other to free the locking means from the feed-dog.

13. In a type-writing machine, the combination of a carriage, escapement mechanism therefor including a feed-dog, a line-lock stop and a margin-stop carried by the carriage, a rock-shaft which is fixed against longitudinal movement, a margin-stop carried by said rock-shaft, a line-lock trip carried by and movable with relation to the rock-shaft, line-lock mechanism which is controlled by the line-lock trip for effecting an engagement with the feed-dog to lock the machine out of operation, and hand-operated means for turning the rock-shaft to release the line-lock mechanism or to permit the margin-stop on the carriage to pass the margin-stop on said rock-shaft.

14. In a type-writing machine, the combination of a carriage, a platen carried by the carriage, line-spacing mechanism including a line-spacing arm, hand-actuated rock-shaft that extends fore and aft of the machine on the frame thereof for moving said arm to effect a line-spacing movement of the platen and the return of the carriage to the right, and adjustable means for regulating the extent of feed movement of said arm and thus regulate the extent of line-spacing movement of the platen.

15. In a type-writing machine, the combination of a carriage, a platen carried by the carriage, line-spacing mechanism including a line-spacing arm which is carried by the carriage and is adapted to receive a movement independent thereof, a rock-shaft that extends fore and aft of the machine, a hand-actuated crank-arm secured to said rock-shaft, intermediate connections between said arm and rock-shaft for moving said arm to effect a line-spacing movement of the platen and the return of the carriage to the right, and an adjustable stop for regulating the extent of the independent movement of said arm in the direction of its feed and thus regulate the extent of line-spacing movement of the platen.

16. In a type-writing machine, the combination of a carriage, a platen carried by the carriage, line-spacing mechanism including a line-spacing arm, and a pawl-carrying rock-shaft to which said arm is secured, said arm and rock-shaft being carried by the carriage and adapted to receive a movement independent thereof, a hand-actuated arm or lever carried by the frame of the machine and situated at the front thereof, for moving said arm to effect a line-spacing movement of the platen and a return of the carriage to the right, and an adjustable stop for regulating the extent of the independent movement of said arm and thus regulate the extent of line-spacing movement of the platen.

17. In a type-writing machine, the combination of a carriage, a feed-rack carried by said carriage, a stepping-dog normally in engagement with the rack, a holding-dog which is normally out of engagement with said rack and which is effective to disengage the stepping dog from the rack, and a hand-operated release-bar which extends substantially throughout the length of the carriage and is operative to disengage the stepping-dog from the rack and thus free the carriage.

In testimony whereof I affix my signature in presence of two witnesses.

GEORGE H. SMITH.

Witnesses:
MINNIE ALLEN,
G. ALLEN.